B. AGNES.
TAILOR'S MEASURING APPLIANCE.
APPLICATION FILED JAN. 18, 1915.
1,148,135. Patented July 27, 1915.
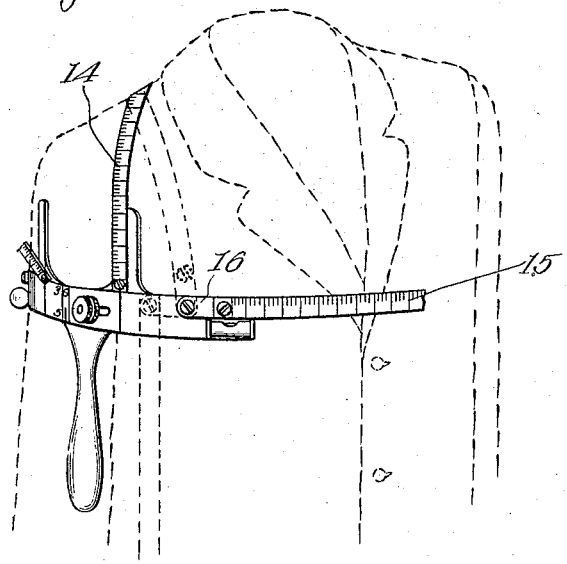
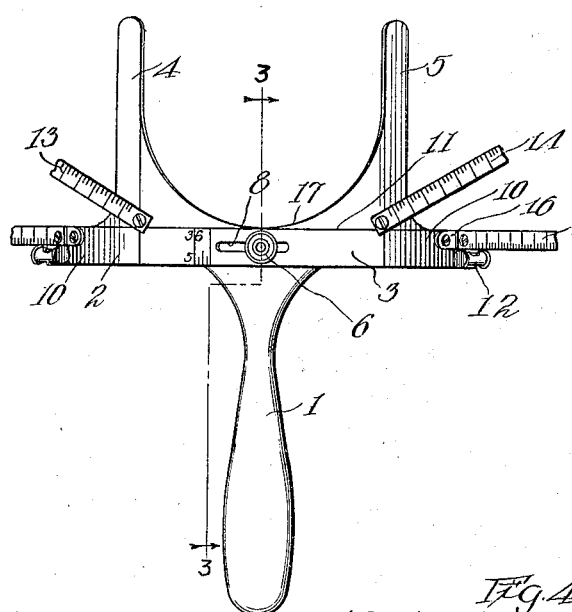
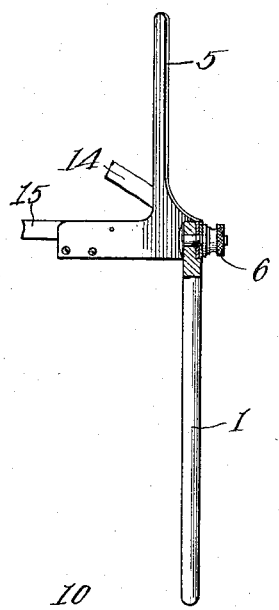
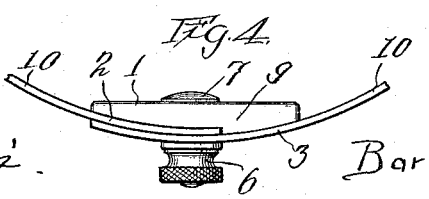
Witnesses:
Inventor:
Barthel Agnes
by Albert Scheibly
Attorney

UNITED STATES PATENT OFFICE.

BARTHEL AGNES, OF CHICAGO, ILLINOIS.

TAILOR'S MEASURING APPLIANCE.

1,148,135.  Specification of Letters Patent.  Patented July 27, 1915.

Application filed January 18, 1915. Serial No. 2,782.

*To all whom it may concern:*

Be it known that I, BARTHEL AGNES, citizen of the United States, residing at Chicago, in the county of Cook and State of Illinois, have invented certain new and useful Improvements in Tailors' Measuring Appliances; and I do hereby declare the following to be a full, clear, and exact description of the invention, such as will enable others skilled in the art to which it appertains to make and use the same.

My invention relates to a tailor's appliance, being intended more particularly for use in taking measurements for upper garments, such as coats.

In its general aspects, the objects of my invention are to provide means for enabling a tailor to establish a fixed plane as a basis for a series of measurements and to provide means for taking various measurements in definite relation to each other with a greater rapidity, certainty and accuracy than has been possible with the appliances now in use. For example, in taking the strap, breast, blade and waist depth measurements, it has been customary to use a socalled "arm square" (consisting of a square with an extra arm sliding upon it) and to adjust the same as close to the arm-pit measurement as the deviation of a flat appliance from the curvature of the body would permit, thereby obliging the user to guess at the exact measurement desired. So also, the tailor has had to depend on his judgment for holding the square as nearly horizontal as he could while taking various measurements from the plane of one edge of the square, and in doing so he could easily be misled by a lack of symmetry in the person he was measuring. Moreover, when holding the square with one hand and bringing a tape measure successively up to the square with his other hand, a shifting in the position of the square between the taking of the various measurements, or a slight spacing between the edge of the square and the end of the tape might pass unnoticed. Consequently, the recorded measurements often have not had the accuracy required for insuring a perfect fit of the garment made from these measurements. My invention aims to overcome these difficulties by providing a simple and easily manipulated appliance for enabling various measurements to be taken rapidly and accurately from a given plane, or along this plane, the same being preferably a horizontal plane through the lowest point of the arm-pit: for accurately indicating to the tailor whether or not the appliance is so held as to maintain the said plane horizontal: for enabling vertical measurements to be taken accurately from the said plane as a starting point: for enabling the arm-pit width to be determined exactly and to be read in inches from the appliance itself: and for enabling the appliance to be set proportionally to the customer's chest measure before using it.

Other objects will be apparent from the following specification and from the accompanying drawings, in which—

Figure 1 is a fragmentary perspective view showing my appliance in use. Fig. 2 is a fragmentary elevation of my appliance, drawn on a larger scale. Fig. 3 is a central vertical section through Fig. 2. Fig. 4 is a fragmentary plan view of my appliance on a still larger scale.

In the embodiment of the drawings, my appliance includes a handle 1 (preferably of wood) carrying a pair of metal members 2 and 3 both curved concentrically and at about the curvature of the chest of the average man. The member 2 is rigidly secured to the handle 1, while the companion member 3 is slidable in a lateral direction with respect to the handle, being readily clamped in any desired position by a thumb-nut 6 mounted on a bolt 7 having a shank extending both through the upper portion of the handle 1 and through a slot 8 in the slidable member 3. The handle 1 preferably has at its upper end a thickened portion 9 compensating for the thickness of the member 2, so so that the member 3 will move in the path of its own curvature when being slid to and fro.

Adjacent to the inner end of the slidable member 3, the member 2 is equipped with two scales which may be read simultaneously from the end of the member 3 and one of which (reading, for example, in eighths of inches from 5 to 6 inches) corresponds to the spacing between vertical arms 4 and 5 carried respectively by the members 2 and 3. The other scale, graduated in the same instance from 36 to 46, indicates the chest measures corresponding to the arm-hole widths ranging from 4 to 5 inches; so that by setting the sliding member to correspond to either the chest measure or the arm-hole width, the other of these two measures will be simultaneously indicated on the other scale.

Each of the members 2 and 3 has a lateral arm 10, the upper edges of said arms being in the same horizontal plane, which plane is preferably indicated also by a line 11 ruled on the surface of the members 2 and 3 and which is the plane from which a series of important measurements are taken, viz, the plane of the bottom of the arm-hole. Attached to each of the arms 10 and carefully alined with respect to the upper edge of the latter is a level 12 for visually indicating whether or not the appliance is so held as to bring the plane of the said edges exactly horizontal.

Secured to each of the members 2 and 3, and preferably in pivotal alinement with the inner edges of the arms 4 and 6 (that is to say, in vertical alinement with the sides of the arm-hole for which my appliance is adjusted) are a pair of measuring tapes 13 and 14, each mounted on a pivot so disposed as to aline the end or zero of the tape with the aforesaid plane when the tape is extended vertically upward from the appliance—as for example, when taking "strap" measure as in Fig. 1. Being pivotally secured to a part of the appliance, either of said tapes can also be swung to a horizontal position, when desired, for taking measurements either across the front or around the back. Each of the curved members 2 and 3 also carries an auxiliary tape 15, which latter preferably is not pivoted directly to the member carrying the same, but is connected to the corresponding member by a link 16, which link is so related to the last named member as to bring the tape with its zero end into alinement with the aforesaid plane of measurements when the tape is used in a generally vertical direction, and also to bring one longitudinal edge of the tape into the same plane when the tape is used in a horizontal direction. It will be obvious from Fig. 5 that when the link 16 is properly located and proportioned, it will automatically attend to this alining of the tape in both directions, so that the user merely need to extend the tape proper in the desired direction without paying any attention to the position of the zero end of the tape. Moreover, since the pivots for all of the tapes are fixed in definite relation to the appliance and therefore to the arm-pit against which the appliance is held, the readings which can thus be taken with great rapidity will always indicate measurements taken from definite points, all of which can easily be plotted on the pattern for the garment.

In using the appliance for coat measuring, the customer's chest measure is first taken with a loose tape measure after the usual manner and the appliance is adjusted to indicate the same on the upper scale, thereby proportionally adjusting the arms 4 and 5 to fit the sides of the arm, although the latter may be readjusted if necessary in the rare instances where the normal proportioning does not hold true. Next, the appliance is held as in Fig. 1, being readily leveled by observing the levels 12, whereupon the tape 14 is used vertically for taking the strap measure (Fig. 1) and horizontally in opposite directions for measuring to the middle of the breast and for the blade measure to the middle of the back. Then the tape 15 is used vertically upward for the over-shoulder measure, and downward for the measure to the waist line. Since the levels 12 will readily indicate that the plane of reference is maintained horizontal, and since the edge 17 of the appliance may be kept under the arm to avoid a shifting in the height of the plane, it will be evident that such measurements as the ones mentioned may be taken in rapid succession and with unusual accuracy. Moreover, it will be evident that my appliance could also be used for taking other measurements whenever these are to be related to a common plane, or to common laying-out points.

While I have shown and described my appliance as equipped with a vertical handle, I do not wish to be limited to this or other details of the construction herein disclosed, as it will be obvious that the same might be modified in many ways without departing from the spirit of my invention.

I claim as my invention:

1. A tailor's appliance comprising a pair of substantially inflexible members both curved about a common vertical axis and each having integral therewith an arm adapted to aline with a side of the arm-hole for which a measurement is being taken; a handle rigid with respect to one of said members, the other members being horizontally slidable with respect to said handle; and means for securing the said slidable member to the handle at any point within its range of sliding movement.

2. A tailor's appliance comprising a pair of relatively slidable and substantially inflexible members, each comprising a horizontal portion and a vertical arm integral therewith, said members concentrically curved about a vertical axis, one of said members equipped with graduations adjacent to an indicating portion of the other member.

3. A tailor's appliance comprising a pair of relatively slidable and substantially inflexible members, each comprising a horizontal portion and a vertical arm integral therewith, said members concentrically curved about a vertical axis, one of said members equipped with graduations adjacent to an indicating portion of the other member, said vertical arms adapted to aline with opposite sides of the arm-hole for which a measurement is being taken, and said graduations including marks indicating the distance between said arms and marks indicating the chest measure normally proportioned to the said distances.

4. A tailor's appliance comprising a pair of relatively slidable and substantially inflexible members, each comprising a horizontal portion and a vertical arm integral therewith, said members concentrically curved about a vertical axis, and a pair of tape measures carried respectively by the said members and having their zero ends disposed in a common horizontal plane.

5. A tailor's appliance comprising a pair of relatively slidable and substantially inflexible members, each comprising a horizontal portion and a vertical arm integral therewith, said members concentrically curved about a vertical axis, means for supporting said members with the opposite ends of their said horizontal portions disposed substantially at right angles to each other, and a pair of spirit levels mounted on the respective members at their said opposite end portions.

6. A tailor's appliance comprising a pair of relatively slidable and substantially inflexible members, each comprising a horizontal portion and a vertical arm integral therewith, said members concentrically curved about a vertical axis, guide means for maintaining the upper edges of the said horizontal portions continuously in a common plane while permitting a relative sliding of said members, the opposite ends of said horizontal portions being disposed substantially at right angles to each other, and spirit levels mounted respectively at the said opposite ends and extending in directions substantially at right angles to each other.

7. In a tailor's appliance, the combination of a pair of relatively slidably and substantially inflexible members curved concentrically about a vertical axis, each of said members comprising a horizontal portion and a vertical arm integral therewith, said arms adapted to aline opposed edges opposite sides of an arm-hole, and a pair of flexible tape measures attached respectively to the said members in alinement with the said edges of the respective arms.

8. In a tailor's appliance, the combination of a pair of relatively slidably and substantially inflexible members curved concentrically about a vertical axis, each of said members comprising a horizontal portion and a vertical arm integral therewith, a handle fast upon one of said members, and clamping means carried by the handle and projecting through the other of said members for rigidly interlocking said members.

In testimony whereof I have signed my name in presence of two subscribing witnesses.

BARTHEL AGNES.

Witnesses:
ALBERT SCHEIBLE,
DOLLY E. KENTRICH.